US006210585B1

(12) United States Patent
Tippett et al.

(10) Patent No.: US 6,210,585 B1
(45) Date of Patent: Apr. 3, 2001

(54) FATTY ACID FREE LATEX POLYMER FLOCCULANTS

(75) Inventors: James Morton Tippett, Oatley; Graeme John Farquharson, Cheltenham, both of (AU); Radhakrishnan Selvarajan, Downers Grove; John T. Malito, Oswego, both of IL (US)

(73) Assignee: Nalco Chemical Company, Naperville, IL (US)

( * ) Notice: Subject to any disclaimer, the term of this patent is extended or adjusted under 35 U.S.C. 154(b) by 0 days.

(21) Appl. No.: 09/539,328

(22) Filed: Mar. 30, 2000

Related U.S. Application Data

(63) Continuation-in-part of application No. 09/127,566, filed on Jul. 31, 1998, now abandoned, which is a continuation-in-part of application No. 08/566,345, filed on Dec. 1, 1995, now abandoned, which is a continuation-in-part of application No. 08/506,936, filed on Jul. 26, 1995, now abandoned.

(51) Int. Cl.[7] .............................. C02F 1/56; C08F 2/32; C08L 33/02
(52) U.S. Cl. .................. 210/698; 210/701; 210/705; 210/732; 210/733; 524/801; 524/832; 524/922
(58) Field of Search .................. 524/801, 832, 524/922; 210/701, 705, 733, 698, 732; 209/5

(56) References Cited

U.S. PATENT DOCUMENTS

| Re. 28,474 | 7/1975 | Anderson et al. . |
|---|---|---|
| Re. 28,576 | 10/1975 | Anderson et al. . |
| 3,284,393 | 11/1966 | Vanderhoff et al. . |
| 3,624,019 | 11/1971 | Anderson et al. . |
| 3,734,873 | 5/1973 | Anderson et al. . |
| 3,767,629 | 10/1973 | Vallino, Jr. et al. . |
| 3,826,771 | 7/1974 | Anderson et al. . |
| 3,915,920 | 10/1975 | Slovinsky et al. . |
| 3,941,738 | 3/1976 | Denda et al. . |
| 3,975,496 | 8/1976 | Smalley et al. . |
| 3,979,348 | 9/1976 | Ballweber et al. . |
| 3,996,180 | 12/1976 | Kane . |
| 3,997,492 | 12/1976 | Kane et al. . |
| 4,024,097 | 5/1977 | Slovinsky et al. . |
| 4,076,648 | 2/1978 | Rosen . |
| 4,090,992 | 5/1978 | Scanley . |
| 4,102,845 | 7/1978 | Schröder et al. . |
| 4,435,528 | * 3/1984 | Domina ............................... 523/332 |
| 4,952,642 | 8/1990 | Fong . |
| 5,008,089 | 4/1991 | Moody et al. . |
| 5,041,269 | 8/1991 | Moody et al. . |
| 5,120,513 | 6/1992 | Moody et al. . |
| 5,217,620 | 6/1993 | Mahoney et al. . |
| 5,284,894 | 2/1994 | Wasyliw et al. . |
| 5,427,750 | 6/1995 | Sommese et al. . |
| 5,461,104 | 10/1995 | Daniel et al. . |
| 5,478,477 | 12/1995 | Ramesh et al. . |
| 5,525,657 | 6/1996 | Anchor et al. . |

OTHER PUBLICATIONS

Chemmunique, ICI Americas Inc., 1976; "The HLB System a time–saving guide to emulsifier selection", pp. 1–20.

* cited by examiner

*Primary Examiner*—David W. Wu
*Assistant Examiner*—Kelechi Egwim
(74) *Attorney, Agent, or Firm*—Michael B. Martin; Thomas M. Breininger

(57) ABSTRACT

A method of separating solids and preventing foaming in an industrial water system comprising adding to fluids in the industrial water system an effective amount of a low foaming latex polymer prepared using a tallow amine ethoxylate/polyoxyethylene oleyl ether emulsifier.

4 Claims, No Drawings

FATTY ACID FREE LATEX POLYMER FLOCCULANTS

CROSS-REFERENCE TO RELATED APPLICATIONS

This application is a continuation-in-part of application Ser. No. 09/127,566, filed Jul. 31, 1998, now abandoned, which is a continuation in part of application serial No. 08/566,345, filed Dec. 1, 1995, now abandoned, which is a continuation in part of application Ser. No. 08/506,936, filed Jul. 26, 1995, now abandoned.

TECHNICAL FIELD

This invention concerns low foaming formulations for use in industrial process fluids. More particularly, this invention concerns a method of separating solids and preventing foaming in an industrial water system using latex polymer flocculants prepared using non-fatty acid or non-fatty ester emulsifiers.

BACKGROUND OF THE INVENTION

Polymeric flocculants are commonly used for the separation of fine particulate matter from a liquid in which it is suspended. This separation occurs by the coalescence of fine particles to form larger aggregates that, by virtue of increased size, will settle at a reasonable rate. Thus, the purification of a liquid in this manner is accomplished by the process of sedimentation, which is conducted in large vessels (settlers or clarifiers) specifically designed for this purpose. It is essential that the flocculant that is added to the liquid being purified does not cause any deleterious effects, in particular, foaming of the liquid.

Foaming can result in a number of unwanted effects, for example gross interference with the sedimentation process due to the flotation (rather than sedimentation) of the solid particles, resulting in reduced efficiency and other negative "downstream" effects. Other deleterious effects of foaming include loss of solids due to solids-laden foam overflowing the vessel, resulting in lost production and creation of a safety hazard, and severe interference with instruments designed to control the sedimentation process including instruments for bed level detection, overflow clarity measurement, and the like.

Latex polymer flocculants are typically prepared using a water-in-oil emulsion polymerization technique whereby aqueous solutions of water-soluble vinyl addition polymers can be rapidly produced. This procedure is well known, and can be exemplified by U.S. Pat. Nos. 3,284,393; Re 28,576; 3,624,019; 3,767,629; 3,826,771; 3,915,920; 3,996,180; 3,979,348; 4,024,097; 3,997,492; Re 28,474 and 3,734,873 among others. A typical water-in-oil emulsion polymer contains a finely divided water soluble polymer dispersed in an oil.

To stabilize such polymers in oil, it is necessary to add one or more emulsifiers to the latex. Traditionally, these emulsifiers have been fatty acids or fatty acid esters. However, the use of a latex polymer that contains such emulsifiers can often introduce new problems such as foaming into an aqueous system to which the latex polymer is added as a treatment. Losses due to foaming have heretofore been accepted as an unavoidable side effect of using latex polymer flocculants, except in cases of severe foaming in which additional anti-foam agents are added to the system.

Flocculation and sedimentation techniques employing latex polymer flocculants are widely used in the mineral processing industries, water and waste treatment and in the production of pulp and paper. Therefore, there is an ongoing need for the development of new non-foaming flocculants for use in these applications.

SUMMARY OF THE INVENTION

It is conventional to use a fatty acid or fatty acid ester emulsifier to perform an emulsion polymerization. By contrast, the inventors have discovered that when a water-in-oil emulsion polymerization is done without fatty acids or fatty acid esters, the properties of the resultant emulsion polymer are greatly improved, in particular by reducing or preventing foaming of the water to which the emulsion polymer is added.

Accordingly, in its principal embodiment, this invention is directed to a method of separating solids and preventing foaming in an industrial water system comprising adding to fluids in the industrial water system an effective amount of a low foaming latex polymer flocculant prepared by (a) adding an aqueous solution of one or more monomers selected from acrylic acid, acrylates of ammonium or sodium or potassium, acrylate esters, acrylamide, 2-acrylamido-2-methylpropanesulfonic acid and salts thereof, styrene sulfonic acid and salts thereof, vinyl acetate and N-vinylpyrrolidinone to an oil phase containing an oil solvent and an emulsifier selected from the group consisting of
  (i) a single non-fatty acid or non-fatty acid ester emulsifier having a hydrophilic-lipophilic balance of from about 4 to about 9 and
  (ii) a combination of at least two non-fatty acid or non-fatty acid ester emulsifiers wherein the combination has a net hydrophilic-lipophilic balance of from about 4 to about 9 and (b) initiating polymerization under free radical conditions to form the latex polymer.

DETAILED DESCRIPTION OF THE INVENTION

"Latex polymer" means an invertible water-in-oil polymer emulsion comprising an aqueous phase, a hydrocarbon oil for the oil phase, one or more non-fatty acid or non-fatty ester water-in-oil emulsifying agents and, potentially, an inverting surfactant. Latex polymers are hydrocarbon continuous with the water-soluble polymers dispersed as micron sized particles within the hydrocarbon matrix. Latex polymers are prepared by dissolving the desired monomers in the aqueous phase, dissolving the emulsifying agent(s) in the oil phase, emulsifying the water phase in the oil phase to prepare a water-in-oil emulsion, in some cases, homogenizing the water-in-oil emulsion and polymerizing the monomers dissolved in the water phase of the water-in-oil emulsion to obtain the polymer as a water-in-oil emulsion. If desired, a self-inverting surfactant can be added after the polymerization is complete in order to obtain a water-in-oil self-inverting emulsion.

The oil phase comprises any inert hydrophobic liquid. Preferred hydrophobic liquids include aliphatic and aromatic hydrocarbon liquids including benzene, xylene, toluene, paraffin oil, mineral spirits, kerosene, naphtha, and the like. A paraffinic oil is preferred.

Free radical yielding initiators such as benzoyl peroxide, lauroyl peroxide, 2,2'-azobis (isobutyronitrile) (AIBN), 2,2'-azobis(2,4-dimethylvaleronitrile) (AIVN), potassium persulfate and the like are useful in polymerizing vinyl and acrylic monomers. The initiator is utilized in amounts ranging between about 0.002 and about 0.2 percent by weight of the monomers, depending upon the solubility of the initiator.

The polymer is prepared by polymerizing the appropriate monomers at from about 30° C. to about 85° C. over about 1 to about 24 hours, preferably at a temperature of from about 40° C. to about 70° C. over about 3 to about 6 hours.

As discussed above, the polymerization is carried out in the presence of one or more non-fatty acid or non-fatty ester emulsifiers. Suitable non-fatty acid or non-fatty ester emulsifiers include those having a hydrophilic-lipophilic balance (HLB) of from about 4 to about 9. Examples of such emulsifiers useful for the practice of this invention include alkyl oxazolines (HLB 4–6) and alkyl imidazolines wherein said imidazolines or oxazolines have a hydrocarbon backbone of from about 11 to about 17 carbon atoms.

High HLB emulsifiers, defined as those having a HLB greater than 9 such as Brij 97 (available from ICI of Australia) can be used in combination with low HLB emulsifiers, so long as the overall or net HLB of the combination is from about 4 to about 9. Representative high HLB emulsifiers useful in combination with low HLB emulsifiers include fatty amine ethoxylate (HLB 9.8–12.0) and fatty alcohol ethoxylate (HLB 4.013.0). As previously stated, though these surfactants have HLB values potentially beyond the specified range, they can be successfully utilized for the practice of this invention when in combination with another emulsifier such that the net HLB for the combination is within the appropriate range of 4–9.

More specifically, emulsifiers such as fatty oleyl amine ethoxylate with 2 moles of ethoxylation, fatty stearyl amine ethoxylate with 2 moles of ethoxylation, and $C_{12}$–$C_{16}$ alcohol ethoxylates with 20 to 30 percent ethoxylation may be utilized in a surfactant combination.

Hypermer 2422 (poly(isobutylene) ethanolamide having HLB of 4.1) and Teric N4 (nonylphenol with 4 moles of ethoxylation having HLB of 8–8.5) are commercial fatty acid free emulsifiers available from ICI Operations Pty Ltd, Alfred Street, Rhodes, 2138, Australia.

A preferred emulsifier system is a combination of tallow amine ethoxylate and polyoxyethylene oleyl ether, in a weight ratio of amine to ether of from about 50:50 to about 60:40.

The amount of emulsifier or emulsifier combination to be utilized depends upon the monomer selected as well as the other conditions of the polymerization, and can be readily determined by one skilled in the art.

In a preferred aspect of this invention, the low-foaming latex polymer is prepared by polymerizing acrylic acid using an emulsifier system comprising a combination of tallow amine ethoxylate and polyoxyethylene oleyl ether, in a weight ratio of amine to ether of from about 50:50 to about 60:40.

The fatty acid and fatty acid ester free latex polymers described herein effectively flocculate solids and prevent foaming in industrial water systems including mineral processing streams, pulp and paper streams and waste water treatment streams. Representative waste water treatment streams include waste sludges, oil recovery waters, metals recovery waters, and the like.

The fatty acid and fatty acid ester free latex polymers may also be used as low-foaming flocculants in mineral processing operations. Representative mineral processing operations include bauxite processing and alumina production, coal beneficiation and residue recovery, phosphate ore beneficiation and production of phosphoric acid, kaolin processing, sand and gravel and aggregate residue recovery and recovery of precious metals (gold, copper, uranium, etc), and the like.

The effective flocculating dose of the fatty acid and fatty acid ester free latex polymers of this invention is readily determined by one of skill in the art taking into consideration the desired settling rate, suspended solids in the settler overflow and the underflow solids density. The effective dose is generally similar to the effective dose of the corresponding flocculant that contains fatty acid or fatty acid emulsifiers.

The foregoing may be better understood by reference to the following Examples, which are presented for purposes of illustration and are not intended to limit the scope of the invention.

EXAMPLE 1

Compound A, a poly(sodium acrylate) representative of conventional fatty acid-containing latex polymers obtained by standard water-in-oil emulsion polymerization techniques, is synthesized in the following manner.

Into a 400 ml beaker are weighed 13 g of Span 80 (sorbitan oleate from ICI Americas Inc., Wilmington, Del. 19850), 8.0 g of Tween 61 (ethoxylated sorbitan monostearate from ICI Americas Inc) and 304 g of Escaid 110 (a hydrocarbon oil from Exxon Chemical Co., Houston, Tex. 77253). The mixture is held at 45° C. with stirring until a clear solution results. It is then transferred into a 1 liter polymerization flask equipped with a condenser, stirrer, nitrogen sparge tube and a thermister probe.

Flocculant grade acrylic acid, 214.4 g (Rohm & Haas Co., Philadelphia, Pa. 19105) is weighed in a 1 liter beaker along with 221.84 g of deionized water. The solution is cooled and stirred with a magnetic stirrer. A 50% solution of NaOH, (238.2 g) is slowly added to neutralize acrylic acid to sodium acrylate, pH 8.5. Then 0.16 g of the sodium salt of EDTA is added to it and complete solution is effected. The monomer solution is transferred to the oil phase with stirring, and deoxygenation of the system is started by purging with nitrogen. After 15 minutes of nitrogen purge, the emulsion is heated to 44° C. and 0.40 g of Vazo 64 (Du Pont Co., Wilmington, Del. 19898) is added to the emulsion to start the polymerization. The polymerization is continued for 5 hours at 44° C. The emulsion is cooled and collected.

About 1 g of the above emulsion is inverted (converted into a water continuous system) by stirring for 30 minutes with a cage stirrer in a 1% aqueous solution of Triton N101 (polyethyleneoxy nonylphenol) from Rohm & Haas. The reduced specific viscosity at 0.04% polymer concentration in 2 Normal $NaNO_3$ is 29 dl/g.

EXAMPLE 2

Compound B, a representative poly(sodium acrylate) prepared using fatty acid free emulsifiers is synthesized in the following manner.

Into a 400 ml beaker are weighed 15 g each of the fatty acid free emulsifiers Ethomeen T/12 (tallow amine ethoxylate) from Akzo Nobel Chemicals, Chicago, Ill. 60606, which is a fatty amine ethoxylate emulsifier and Brij 93 (polyoxyethylene oleyl ether) from ICI Americas Inc., which is a fatty alcohol ethoxylate emulsifier and 304 g of Escaid 110 from Exxon Chemical Co. The mixture is held at 45° C. with stirring until a clear solution results. It is then transferred into a 1 liter polymerization flask equipped with a condenser, stirrer, nitrogen sparge tube and a thermister probe.

Flocculant grade acrylic acid, 214.4 g (Rohm & Haas Co., Philadelphia, Pa. 19105) is weighed in a 1 liter beaker along with 212.84 g of deionized water. The solution is cooled and stirred with a magnetic stirrer. A 50% solution of NaOH (238.2 g) is slowly added to neutralize acrylic acid to sodium acrylate, pH 8.5. Then 0.16 g of the sodium salt of EDTA is added to it and complete solution is effected. The monomer solution is transferred to the oil phase with stirring, and deoxygenation of the system is started by purging with nitrogen. After 15 minutes of nitrogen purge, the emulsion is heated to 44° C. and 0.40 g of Vazo 64 (Du Pont Co., Wilmington, Del. 19898) is added to the emulsion to start the polymerization. The polymerization is continued for 5 hours at 44° C. The emulsion is cooled and collected.

TABLE 1

AntiFoaming Effectiveness of Compound A

| Treatment | Dose mg/L | Initial Defoaming min:sec | Complete Defoaming min:sec |
|---|---|---|---|
| none | n/a | 06:35 | 14:20 |
| Compound A | 2.6 | 13:06 | 24:00 |
| Compound A | 5.4 | 22:15 | 27:00 |

TABLE II

Detailed Foam Performance of Compound B

| | | Control (no floc) | | | | | | Compound B, 5.4 mg/L | | | | | | |
|---|---|---|---|---|---|---|---|---|---|---|---|---|---|---|
| | | Test | | | | | | Test | | | | | | |
| | | 1 | 2 | 3 | 4 | 5 | average | 1 | 2 | 3 | 4 | 5 | 6 | average |
| Foam @ 5 min. aeration, % of slurry volume | | 40 | 83 | 40 | 56 | 44 | 52.6 | 50 | 40 | 35 | 60 | 60 | 45 | 48 |
| Foam remaining after time, % of slurry volume | min. | | | | | | | | | | | | | |
| | 0 | 33 | 20 | 10 | 12 | 8 | 16.6 | 8 | 6 | 4 | 10 | 8 | 10 | 7.6 |
| | 1 | 10 | 6 | 6 | 6 | 4 | 6.4 | 4 | 4 | 2 | 8 | 4 | 6 | 4.8 |
| | 2 | 6 | 4 | 5 | 4 | 2 | 4.2 | 4 | 2 | 0 | 8 | 4 | 6 | 4 |
| | 3 | 4 | 2 | 6 | 4 | 1 | 3.4 | 4 | 2 | 0 | 4 | 2 | 2 | 2 |
| | 4 | 2 | 2 | 4 | 2 | 1 | 2.2 | 2 | 0 | 0 | 3 | 1 | 1 | 1 |
| | 5 | 2 | 1 | 3 | 1 | 0 | 1.4 | 0 | 0 | 0 | 3 | 0 | 1 | 0.8 |
| | 6 | 1 | 0 | 2 | 0 | 0 | 0.6 | 0 | 0 | 0 | 2 | 0 | 0 | 0.4 |
| | 7 | 0 | 0 | 2 | 0 | 0 | 0.4 | 0 | 0 | 0 | 1 | 0 | 0 | 0.2 |
| | 8 | 0 | 0 | 1 | 0 | 0 | 0.2 | 0 | 0 | 0 | 0 | 0 | 0 | 0 |
| | 9 | 0 | 0 | 1 | 0 | 0 | 0.2 | 0 | 0 | 0 | 0 | 0 | 0 | 0 |
| | 10 | 0 | 0 | 0 | 0 | 0 | 0 | 0 | 0 | 0 | 0 | 0 | 0 | 0 |
| Initial Defoaming, min. | | 18 | 7 | 12 | 7 | 6 | 10 | 6 | 6 | 4 | 11 | 12 | 10 | 8.6 |
| Complete Defoaming, min. | | 13 | 12 | 17 | 11 | 14 | 13.4 | 11 | 10 | 9 | 16 | 18 | 15 | 13.6 |
| Average Temperature, C. | | 82 | 73 | 70 | 76 | 70 | 74.2 | 75 | 70 | 69 | 73 | 72 | 72 | 71.2 |

About 1 g of the above emulsion is inverted (converted into a water continuous system) by stirring for 30 minutes with a cage stirrer in a 1% aqueous solution of Triton N101 (polyethyleneoxy nonylphenol) from Rohm & Haas. The reduced specific viscosity at 0.04% polymer concentration in 2 Normal $NaNO_3$ is 30 dl/g.

EXAMPLE 3

This example illustrates the foam-preventing effectiveness of the fatty acid and fatty acid ester free latex polymers prepared by the synthetic technique of Example 2.

A one-liter glass cylinder is filled with settler feed slurry comprising a suspension of bauxite waste solids suspended in process liquor (red mud) and placed in a hot water bath (100 degrees C.). A sparge tube is immersed to the bottom of the cylinder and air is blown through the slurry for a period of approximately 5 minutes. The volume of foam (expressed as % of the slurry volume) is recorded after this time period. The air sparge is then discontinued and the time required for the foam to subside until a mirror placed behind the cylinder became visible (initial defoaming), and the time required for the foam to dissipate completely (complete defoaming), are recorded. In most tests the volume of foam, following cessation of air sparging, is recorded every minute over a 10-minute period.

Changes can be made in the composition, operation and arrangement of the method of the present invention described herein without departing from the concept and scope of the invention as defined in the following claims:

What is claimed is:

1. A method of separating solids and preventing foaming in an industrial water system comprising adding to fluids in the industrial water system an effective amount of a low foaming latex polymer flocculant prepared by
    (a) adding an aqueous solution of one or more monomers selected from the group consisting of acrylic acid, acrylates of ammonium, sodium and potassium, acrylate esters, acrylamide, 2-acrylamido-2-methylpropanesulfonic acid and salts thereof, styrene sulfonic acid and salts thereof, vinyl acetate and N-vinylpyrrolidinone to an oil phase containing an oil solvent and an emulsifier; wherein the emulsifier is a combination of tallow amine ethoxylate and polyoxyethylene oleyl ether in a weight ratio of amine to ether of from about 50:50 to about 60:40 and
    (b) initiating polymerization under free radical conditions to form the latex polymer.

2. The method of claim 1 wherein the monomer is acrylic acid.

3. The method of claim 1 wherein the industrial water system is selected from the group consisting of mineral processing streams, pulp and paper streams and waste water treatment streams.

4. The method of claim 2 wherein the waste water treatment stream is selected from the group consisting of waste sludges, oil recovery waters and metals recovery waters.

* * * * *